United States Patent [19]
Lally et al.

[11] Patent Number: 6,162,844
[45] Date of Patent: Dec. 19, 2000

[54] METHOD AND COMPOSITION FOR INCORPORATING RADIATION-ABSORBING AGENTS INTO POLYMERS

[75] Inventors: John Martin Lally, Lilburn; Deborah Jean Mulcahy, Duluth, both of Ga.; Achim Müller, Aschaffenburg, Germany; Beat Müller, Marly, Switzerland; Bernhard Seiferling, Goldbach, Germany; Friedrich Stockinger, Courtepin, Switzerland

[73] Assignee: Novartis AG, Basel, Switzerland

[21] Appl. No.: 09/469,680

[22] Filed: Dec. 22, 1999

Related U.S. Application Data

[63] Continuation-in-part of application No. 08/691,157, Aug. 1, 1996, abandoned.

[51] Int. Cl.$^7$ .......................... C08L 29/04; C09B 62/00; G02C 7/04; D06P 3/58
[52] U.S. Cl. .................... 523/106; 8/507; 8/509; 8/549; 524/91; 524/501; 524/503; 525/57; 525/937
[58] Field of Search ................. 523/106; 8/507, 8/509, 549; 524/91, 501, 503; 525/57, 937

[56] References Cited

U.S. PATENT DOCUMENTS

| | | | |
|---|---|---|---|
| 4,157,892 | 6/1979 | Tanaka et al. | 8/14 |
| 4,252,421 | 2/1981 | Foley | 351/162 |
| 4,468,229 | 8/1984 | Su | 8/507 |
| 4,553,975 | 11/1985 | Su | 8/507 |
| 4,559,059 | 12/1985 | Su | 9/507 |
| 4,891,046 | 1/1990 | Wittman | 8/507 |
| 4,929,250 | 5/1990 | Hung | 8/507 |
| 4,963,160 | 10/1990 | Hung | 8/507 |
| 5,272,212 | 12/1993 | Kitahara | 525/301 |
| 5,292,350 | 3/1994 | Molock | 8/507 |
| 5,321,112 | 6/1994 | Olson | 528/75 |
| 5,480,927 | 1/1996 | Janssen | 524/100 |
| 5,508,317 | 4/1996 | Mueller | 522/85 |

FOREIGN PATENT DOCUMENTS

| | | |
|---|---|---|
| 0 072353 A2 | 8/1982 | European Pat. Off. . |
| 0 482 407 A2 | 8/1991 | European Pat. Off. . |
| 0595 575 A1 | 10/1993 | European Pat. Off. . |
| 04293010 | 10/1993 | Japan . |
| 06064265 | 10/1994 | Japan . |

*Primary Examiner*—Peter A. Szekely
*Attorney, Agent, or Firm*—R. Scott Meece; Robert J. Gorman, Jr.

[57] ABSTRACT

A method of incorporating radiation-absorbing agents (i.e., dyes) into polymeric materials. A preferred method involves crosslinking or polymerizing a polymerizable or crosslinkable material in the presence of a polymeric dye. A preferred product is a tinted contact lens comprising poly(vinyl alcohol). The methods offer advantages in reduced fabrication cycles, reduced extractables, elimination of post-polymerization activation steps, elimination of post-polymerization extraction steps and reduced scrap and costs associated with lens handling.

43 Claims, 4 Drawing Sheets

METHOD AND COMPOSITION FOR INCORPORATING RADIATION-ABSORBING AGENTS INTO POLYMERS

This is a continuation-in-part of application Ser. No. 08/691,157, filed Aug. 1, 1996 now abandoned.

BACKGROUND OF THE INVENTION

1. Field of the Invention

The invention relates to incorporating radiation-absorbing components into polymeric articles. In a preferred embodiment, this invention relates to methods of tinting ophthalmic lenses, especially contact lenses, and lens compositions.

2. Description of the Related Art

A number of radiation-absorbing agents have been incorporated into ophthalmic lenses, especially contact lenses, for a variety of reasons. Two popular types of radiation-absorbing agents include ultraviolet (UV) light-absorbing agents and visible light absorbing agents, i.e., tinting agents. A number of patents have issued and a number of patent applications have been published relating to this technology. Some of these patents and publications are discussed below in order to provide the reader with an understanding of the state of the art.

U.S. Pat. No. 4,157,892, issued to Tanaka, et al. on Jun. 12, 1979, teaches a method of coloring a water-absorbable plastic. The method involves forming a soft contact lens and immersing the lens in an aqueous solution of a diazonium salt at a pH suitable to cause a coupling reaction to form an azoic dye within the lens.

U.S. Pat. No. 4,553,975, issued to Kai Su on Nov. 19, 1985, and U.S. Pat. No. 4,559,059, issued to Kai Su on Dec. 17, 1985, describe polymeric lens materials in which exoskeletal covalent bonds are formed between reactive dyestuffs and monomer units of the polymer backbone. The formation of the covalent bond is effected by contacting the dyestuff formulation with the lens material under basic pH conditions.

U.S. Pat. No. 4,891,046 issued to Wittman, et al. on Jan. 2, 1990, teaches a process of tinting lenses by impregnating the lens with an aqueous solution of a dichlorotriazine reactive dye and fixing the dye in the lens by immersing the lens in an aqueous alkaline solution.

U.S. Pat. No. 4,929,250, issued to Hung, et al. on May 29, 1990, discloses a method of preparing a UV-absorbing lens by contacting the lens with a solution including an agent having a reactive halotriazine bonded to an aqueous soluble moiety and a UV radiation-absorbing component.

U.S. Pat. No. 5,292,350, issued to Molock, et al. on Mar. 8, 1994, teaches a method of tinting a soft contact lens by (a) polymerizing a mixture of (i) a hydrophilic acrylate monomer and (ii) a water-soluble halotriazine dye to form a lens, then (b) immersing the lens in an aqueous alkali to react the dye with the hydroxyalkyl groups of the acrylate.

European Patent Application Publication No. 0 472 496 A2, by Auten, et al., teaches a method of forming a tinted lens by (a) applying an ink formulation to a lens mold, (b) allowing the ink formulation to dry, (c) adding lens forming material, (d) forming the lens, and (e) placing the lens in an activating medium.

U.S. Pat. No. 5,480,927, issued to Janssen, et al., on Jan. 2, 1996 teaches a method and composition useful in fabricating radiation-absorbing contact lenses, especially ultraviolet (UV) and visible (tint) light-absorbing lenses. The radiation-absorber is incorporated into a contact lens in the presence of a buffer which maintains the pH near neutral. Subsequently, the radiation absorber is chemically affixed to the lens by raising the pH to a highly basic level. This process increases the amount of radiation-absorber affixed to the lens.

Thus, polymerization typically occurs first, to form the lens structure, then the dye material is activated and reacted with the lens material. Activation is followed by extraction of unreacted dye material and activation material from the lens. There remains a need to reduce the processing time, handling, scrap, material usage and equipment required for the preparation of polymeric articles including radiation-absorbing agents.

SUMMARY OF THE INVENTION

An object of the invention is to provide a method of incorporating a radiation-absorbing agent into a polymeric material in an efficient manner.

Another object of the invention is to provide a method of incorporating a radiation-absorbing agent into a polymeric material which minimizes subsequent leaching or migration of the agent from the polymeric material.

A further object of the invention is to provide a method of incorporating a radiation-absorbing agent into a polymeric material in which a subsequent related activation is not required for the polymeric article.

Yet another object of the invention is to provide a method of incorporating a radiation-absorbing agent into a polymeric material in which a subsequent related extraction step is not required.

Still another object of the invention is to provide a method of incorporating a radiation-absorbing agent into a polymeric material which minimizes subsequent processing of the formed polymeric material.

A further object of the invention is to provide a polymeric dye which can be efficiently purified.

These and other objects and advantages are achieved by the present invention, a summary of which follows.

One embodiment of the invention is a method of incorporating a radiation-absorbing agent (i.e., dye) into a polymeric material. The method involves introducing at least one polymeric dye and at least one polymerizable or crosslinkable material into a mold, and crosslinking or polymerizing to form a solid polymeric product. In a preferred embodiment, the polymeric dye is provided in a purified form, substantially free of leachable materials. The polymeric dye is entrapped physically within the polymer matrix, such that no substantial amount of dye or polymeric dye may be leached out of the polymeric product. A preferred crosslinkable material is a purified poly(vinyl alcohol) polymer precursor containing reactive groups.

Another embodiment of the invention is a polymeric article which is a crosslinked or polymerized product of mixture including (a) a polymerizable or crosslinkable material and (b) a polymeric dye. A preferred polymeric article is an ophthalmic lens, especially a tinted contact lens.

Figure 1A:
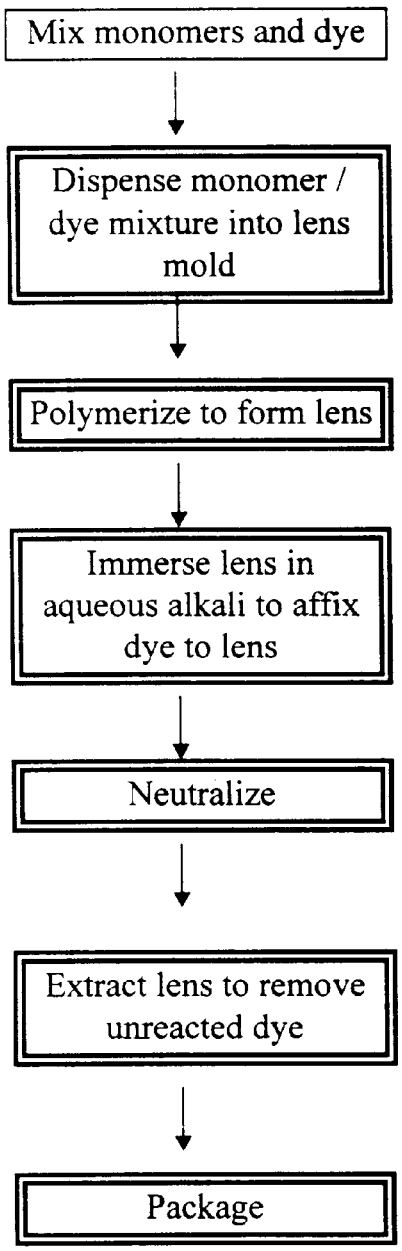
FIG. 1a is a schematic diagram of one prior art tinting process.

OUTLINE OF DESCRIPTION
I. GENERAL DESCRIPTION AND DEFINITIONS
II. UTILITY
III. ADVANTAGES OF THE PROCESS
IV. DETAILED DESCRIPTION OF THE PROCESS AND COMPOSITIONS
    A. OVERVIEW
    B. POLYMERIC DYE
      1. REACTIVE DYE
      2. ACTIVATION OF DYE
      3. POLYMER DYE PRECURSOR
      4. FORMATION OF POLYMERIC DYE
      5. PURIFICATION OF POLYMERIC DYE
    C. CROSSLINKABLE OR POLYMERIZABLE MATERIAL
      1. POLYMERIZABLE MATERIALS
      2. CROSSLINKABLE POLYMER PRECURSOR
        a. PREFERRED POLYMER PRECURSOR
        b. POLYMER PRECURSOR MOLECULAR WEIGHT
        c. POLYMER PRECURSOR WATER SOLUBILITY
        d. ADVANTAGES OF THE PREFERRED MATERIALS
      3. COMONOMERS
      4. SOLVENTS
      5. PHOTOINITIATORS
      6. PURIFICATION
    D. MOLDING PROCESS
      1. GENERAL DESCRIPTION
      2. INITIATION OF POLYMERIZATION OR CROSSLINKING

DESCRIPTION OF THE PREFERRED EMBODIMENTS

I. General Description and Definitions

One embodiment of the present invention is a method incorporating a reactive dye into a polymeric article. The method involves the steps of preparing or providing a first mixture of a polymeric dye precursor; reacting a reactive dye to the polymeric dye precursor, thereby forming a polymeric dye, which does not have any significant reactive groups attahced thereto; providing a second mixture including crosslinkable or polymerizable material selected from the group consisting of monomers, oligomers, macromers and crosslinkable polymer precursors; mixing the polymeric dye and the polymerizable or crosslinkable material; and crosslinking or polymerizing to form a solid polymer article. In order to clearly describe the invention, some of the aforementioned terms will be defined generally at the outset, and in more detail throughout the specification.

The term "polymeric dye precursor", as used herein, refers to a material which includes groups capable of reacting with a reactive dye (e.g., hydroxyl groups or ethylenically unsaturated bonds) and which has a molecular weight or structure sufficiently large to cause the material to be physically entrapped within the polymeric matrix of the article to be produced. Thus, the limitation on the size and/or shape of the polymer precursor is primarily a functional limitation, i.e., no or substantially no polymeric dye precursor will leach out of the finished polymeric article. The polymeric dye may be physically entrapped in the polymer matrix because at least one dimension of the three-dimensional shape is larger than the pore sizes of the finished article, e.g., entanglement of the polymeric dye by the chains of the polymer matrix. In one preferred embodiment, the polymeric dye precursor has a weight average molecular weight of at least about 2000. In another embodiment, the polymeric dye precursor has a weight average molecular weight of about 10,000 to about 300,000. In yet another embodiment, the polymeric dye precursor has a weight average molecular weight of about 50,000 to about 100,000.

The term "reactive dye", as used herein, refers to a species which has groups which are reactive with the polymeric dye precursor (e.g., ethylenically unsaturated bonds) and which absorbs radiation (e.g., ultraviolet, infrared or visible light). Thus, the term "dye" refers to a radiation-absorbing material.

The term "polymeric dye", as used herein, refers to a material which has a molecular weight or structure sufficiently large to cause the material to be physically entrapped within the polymeric matrix of the article to be produced and which includes a radiation-absorbing moiety. A polymeric dye is preferably the reaction product of a polymeric dye precursor and a reactive dye.

The term "polymer precursor", as used herein, refers to a relatively high molecular weight material that can react with a dye to form a polymeric dye. While the molecular weight of the polymer precursor may vary, a preferred polymer precursor weight average molecular weight is at least about 2000.

The term "crosslinkable polymer precursor", as used herein, means a polymer precursor having crosslinkable groups. "Crosslinkable groups" denotes customary crosslinkable groups well-known to the person skilled in the art, such as, for example, photocrosslinkable or thermally crosslinkable groups. Crosslinkable groups include carbon-carbon double bonds.

The term "polymerizable or crosslinkable material", as used herein, means materials which may be polymerized or crosslinked to form a polymeric material. Thus, the term "polymerizable or crosslinkable material" includes monomers, oligomers, macromers, crosslinkable polymer precursors, mixtures thereof and the like.

II. Utility

The present invention has utility in the fabrication of a wide variety of translucent or transparent polymeric products, including without limitation thereto, translucent automotive windshields or side glazing; films or membranes such as membranes for diffusion control, photostructurizable films for information storage, or photoresist materials (e.g., membranes or moldings for etch resist or screen printing resist); plastic eyeglasses or spectacles, and, especially, ophthalmic lenses. Ophthalmic lenses, as used herein, refers to contact lenses (hard or soft), intraocular lenses, eye bandages and artificial corneas. The present invention has particular utility with regard to the fabrication of soft, hydrophilic contact lenses. While the invention will be discussed primarily with respect to the preferred application in contact lenses, it should be understood that the invention is not so limited.

A preferred embodiment of the invention is directed to contact lenses that comprise a radiation-absorbing polymer according to the invention, especially those which consist substantially or wholly of a tinted polyvinyl alcohol polymer as disclosed herein. Such contact lenses have a wide range of unusual and extremely advantageous properties, which include, for example, their excellent compatibility with the human cornea, which is based on a balanced relationship of water content, oxygen permeability, mechanical properties and dimensional stability.

III. Advantages

The present methods of contact lens formation and tinting demonstrate remarkable improvements in process efficiency. In one respect, the radiation-absorbing lenses of the present invention are particularly advantageous in that leaching of dye is essentially eliminated because the dye is affixed to a polymer prior to polymerization or crosslinking. Thus, the high molecular weight or large three dimensional shape of the polymeric dye causes the dye to be trapped in the polymer network of the polymeric product, e.g., by its size or entanglement.

Another advantage of the invention is that the need for an extraction step subsequent to lens formation may be eliminated because the activation and reaction of the dye to the polymeric dye precursor, and the optional purification, occur prior to mixing with polymerizable or crosslinkable material. Thus, only polymeric dye is mixed with the polymerizable or crosslinkable material. In contrast, prior art processes require extraction of unreacted dye, activation materials (e.g. bases) and salts from the final polymer product.

Yet another advantage of the invention is that the polymeric dye may be readily purified to remove undesirable components prior to mixing with the polymerizable or crosslinkable material. The physical size and/or shape of the polymeric dye provides a basis for separation from smaller undesirable components, such as unreacted dye, by well known processes such as ultrafiltration or precipitation.

In another respect, the present methods of forming radiation-absorbing polymeric articles are advantageous in reducing in-line processing steps. "In-line processing steps" are those steps which must be accomplished in the process of forming the polymeric article, i.e., steps which cannot be done outside the production process and which must be done in series. The present tinted polymeric articles may be formed by activating and affixing the dye to the polymeric dye precursor prior to entry into the production process. Thus, the dye activation and reaction steps may be accomplished in parallel with other steps of the production process. The reduction of processing steps, and/or the rearrangement of steps, offers advantages in reduced cycle time and reduced scrap associated with additional processing steps. In addition, reductions in labor, equipment and material costs related to additional processing steps may be achieved.

Figure 2:
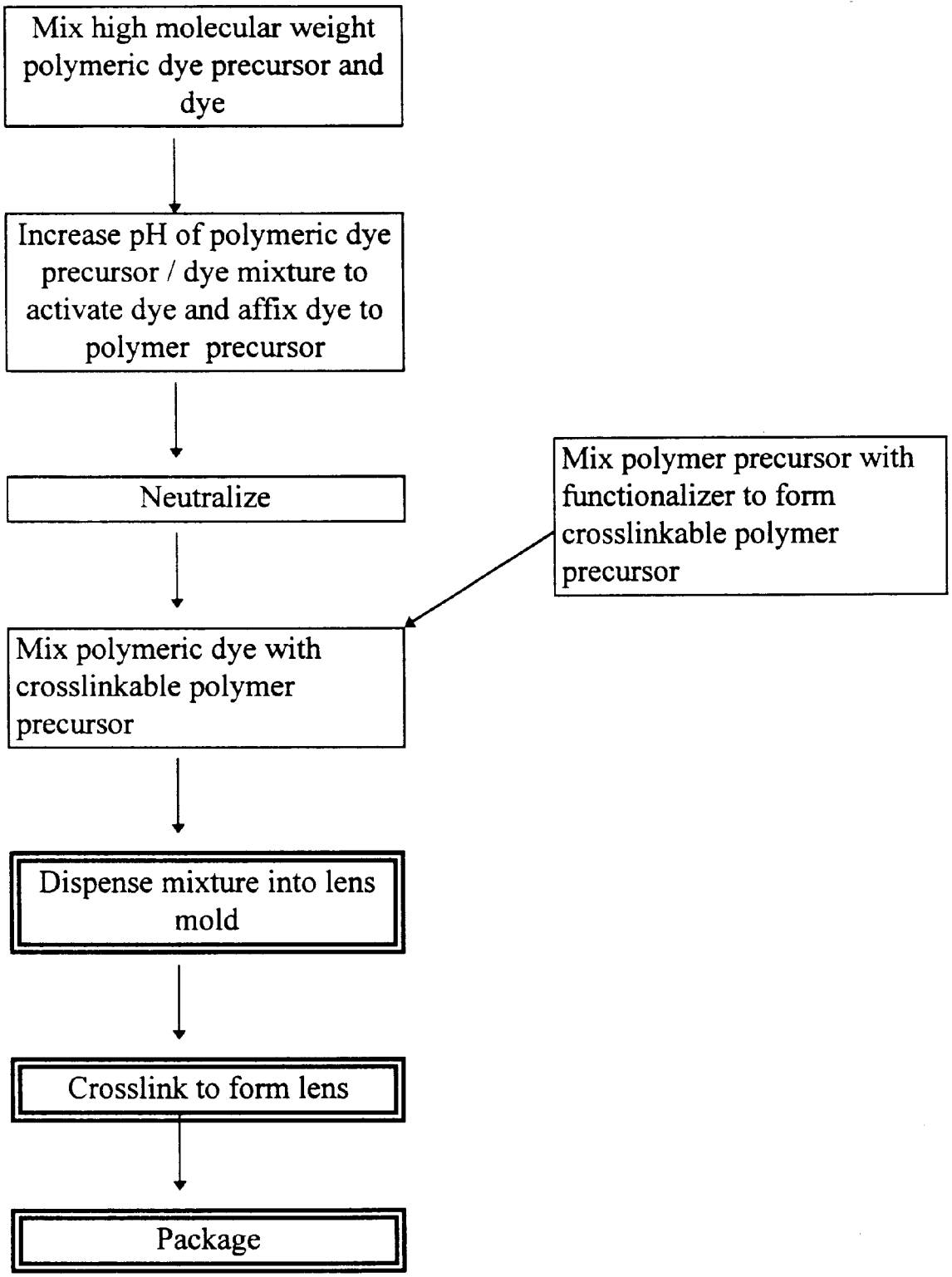
FIG. 2 is a schematic diagram of one embodiment of the present innovative process.
Figure 3:
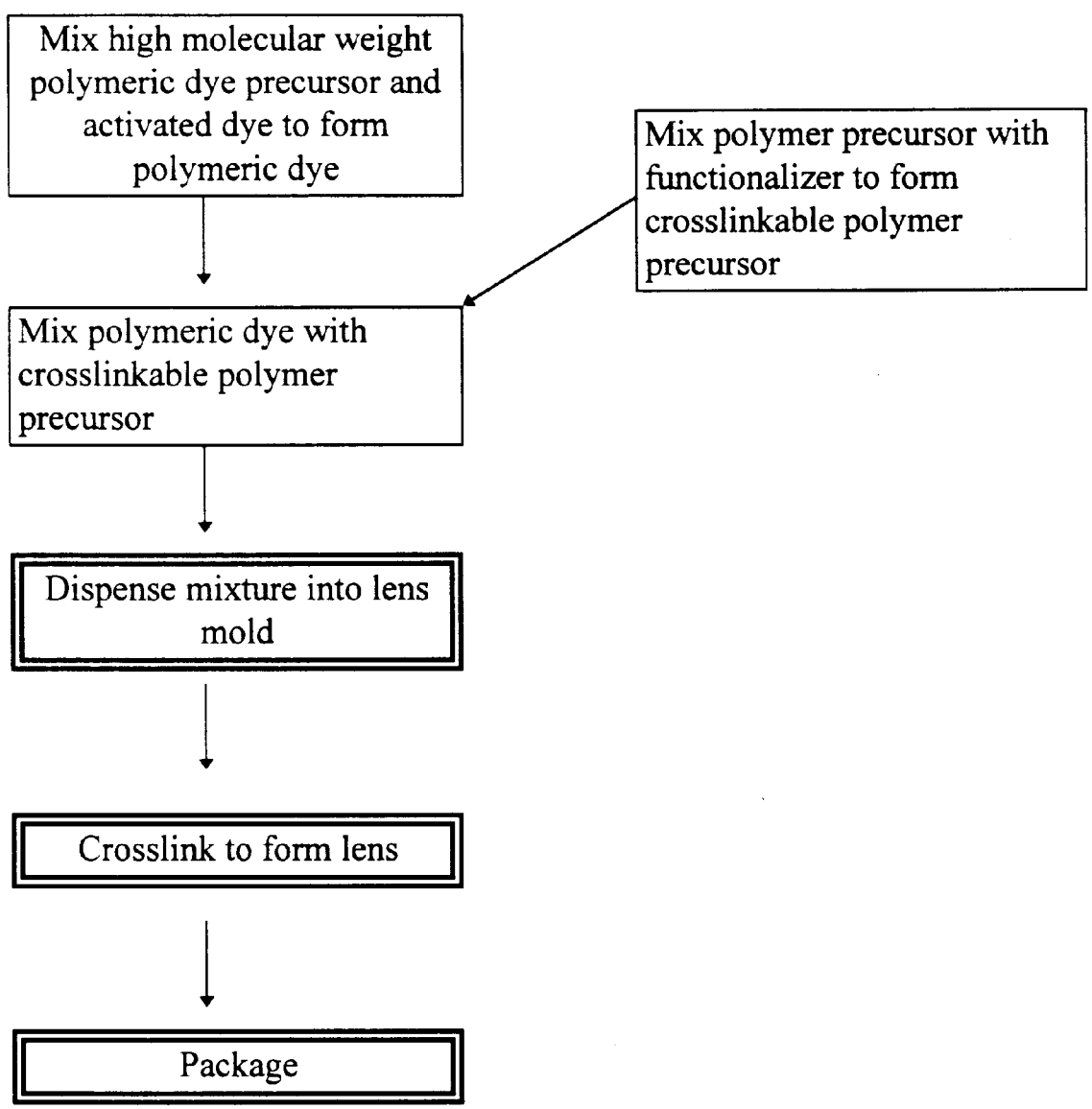
FIG. 3 is a schematic diagram of another embodiment of the present innovative process.

The improved efficiency of the present invention may be more easily understood with reference to the Figures. A comparison of the FIGS. 1A and 1B prior art tinting techniques to the FIG. 2 and FIG. 3 methods of the present invention illustrates that the present invention reduces a number of in-line processing steps (the double lined boxes represent in-line processing steps). FIG. 2 illustrates a process in which the reactive dye must be activated while FIG. 3 illustrates a process in which the reactive dye is commercially purchased or provided in the activated state.

Figure 1B:
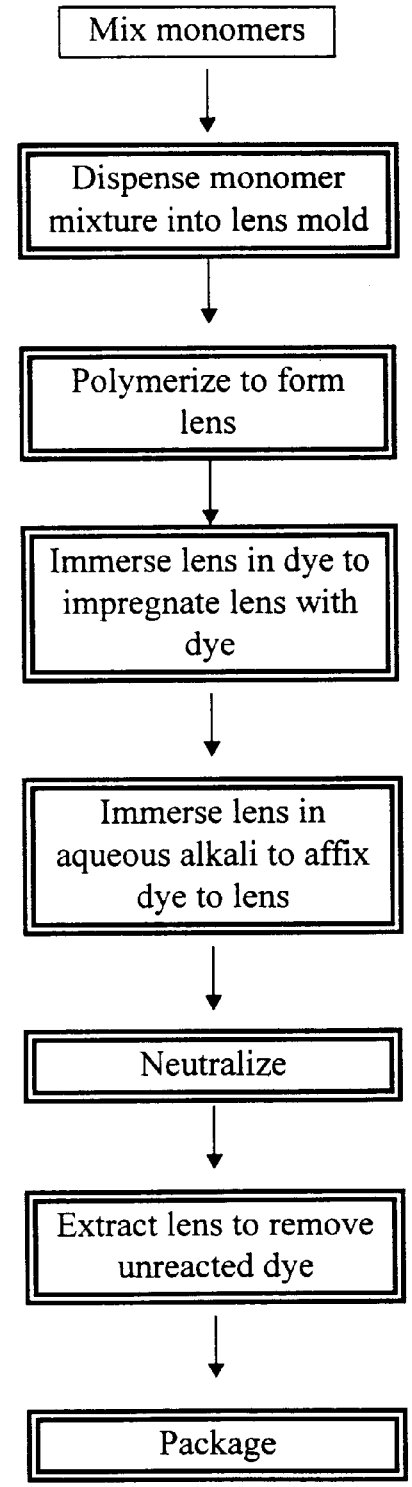
FIG. 1b is a schematic diagram of another prior art tinting process.

With regard to the FIG. 1A process, the present invention allows for omission of the in-line alkali treatment, the in-line neutralization step and the in-line extraction step. With regard to the FIG. 1B process, the present invention allows for omission a dye immersion step in addition to elimination of the three previously-discussed steps. Moreover, not only is extraction eliminated in the in-line process, but extraction is not an essential element of the present invention at all. Thus, the present invention offers significant improvements in cycle time and improvements in processing efficiency.

With respect to the preferred contact lens tinting embodiment, the process disclosed herein offers numerous advantages over known contact lens tinting processes. This innovative lens tinting process offers advantages in (1) process speed, simplicity and efficiency, (2) elimination of post-molding tint activation steps, (3) elimination of post-molding extraction steps, and (4) improved product consistency. These advantages translate into reductions in manufacturing manpower, cycle time, material costs and scrap, and/or equipment costs. Further, product quality may be inherently increased over the prior art techniques.

In prior art lens tinting techniques, tint is typically applied to the molded lens subsequent to polymerization. After contacting the lens with the tinting additive, the tint is chemically bonded to the polymer backbone in an activation step, typically requiring immersion of the lens in a high pH solution. Subsequently, the lens is extracted, commonly in a series of extraction steps, to remove unreacted dye and impurities. Significant processing time is required to properly soak the lens in the tinting additive and/or basic activation solution for uniform tinting, because the lens is a solid material which inhibited uniform dispersion.

In contrast, the present method involves tinting of the polymeric dye precursor while the polymeric dye precursor is still in a solution state, thereby enabling uniform tint dispersion throughout the lens by simple mixing of the polymeric dye with the polymerizable material. In addition, the bonding the dye to the polymeric dye precursor is accomplished before dispensing the polymeric dye precursor into the lens mold (i.e., before the in-line production process), thereby eliminating the need to extract the final lens product to remove unreacted dye. Purification of the polymeric dye precursor mixture is less difficult than purification of a finished lens because the mixture is a solution while the lens is a solid. Further, any purification of the polymeric dye is accomplished prior to the in-line production process, thereby reducing cycle time. Thus, polymeric dye solutions may be prepared in parallel with the molding process, as opposed to the prior art process which required tinting in series with the molding process. This parallel tinting/molding approach, along with the elimination of extraction steps, reduces cycle time, thereby increasing production rates.

However, purification of the polymeric dye solution may be desirable to remove unreacted dye or other undesirable components. Yet, if this purification is desired or required, it may be accomplished in the solution state, as opposed to prior art processes which tint the lens in solid form. Purification efficiency is much higher and purification processing time is typically lower in the solution state as opposed to the solid state. Purification of the polymeric dye is especially efficient because the high molecular weight of the polymeric dye relative to unreacted dye provides a basis for various separation techniques based on molecular weight and molecular size. For example, purification of the polymeric dye solution may be accomplished by ultrafiltration.

Furthermore, the present process can improve product consistency, thereby reducing scrap and increasing quality. The improved consistency is attributed, in part, to the thorough mixing of the polymerizable or crosslinkable material and polymeric dye in the liquid state, in contrast to the prior art application of dye and activation solution on the surface or body of the solid lens.

It should be noted that the dye may be reacted with all of the crosslinkable polymer precursor used to form the contact lens. However, the basic conditions required to chemically bond the tinting agent to the polymer precursor cause undesirable partial hydrolysis of acetate groups of the preferred poly(vinyl alcohol) polymer precursor. The loss of acetate groups increases the viscosity of the polymer precursor solution to an undesirable level. This high viscosity can result in undesirable processing conditions and/or final contact lens properties. Accordingly, it is preferred to form (a) a relatively small amount of polymeric dye and (b) a solution of polymerizable or crosslinkable materials, such as monomers or crosslinkable polymer precursors, and then to mix the two solutions prior to crosslinking to mold the lens.

IV. Detailed Description of the Process and Compositions

A. Overview

Generally, one embodiment of the present invention is a process of incorporating a radiation-absorbing agent into a molded polymeric article. Clearly, another embodiment is a radiation-absorbing molded polymer article formed by the advantageous process. The process of forming a radiation-absorbing polymeric article includes the steps of:

(a) providing a polymerizable or crosslinkable material;

(b) providing a polymeric dye, which is at least substantially free or free of reactive sites that can chemically react with the polymerizable or crosslinkable material;

(c) mixing the polymeric dye and the polymerizable or crosslinkable material; and (d) initiating crosslinking or polymerization to form a polymer article.

A preferred embodiment includes the following steps:

(a) providing a first mixture of high molecular weight polymer precursor;

(b) reacting a reactive dye with the polymeric precursor of the first mixture, thereby forming a second mixture comprising a polymeric dye, thereby bonding the dye to the polymer precursor and eliminating or significantly eliminating the polymerizable or crosslinkable groups from the polymer precursor;

(c) providing a third mixture including polymerizable or crosslinkable material, comprising polymer precursors, macromers, oligomers, and/or monomers, and in a preferred embodiment comprising crosslinkable polymer precursor;

(d) mixing the polymeric dye mixture and the polymerizable or crosslinkable material to form a fourth mixture (e) introducing the fourth mixture into a mold; and (f) crosslinking or polymerizing the fourth mixture to form a radiation-absorbing polymeric article.

In a another preferred embodiment, the process for the manufacture of ophthalmic lenses comprises the following steps:

(a) providing a first aqueous solution of a water-soluble polymeric dye precursor that comprises reactive groups;

(b) providing a reactive dye solution;

(c) activating the reactive dye by increasing the pH of the reactive dye solution;

(d) mixing the reactive dye solution with the polymeric dye precusor solution, thereby reacting reactive dye with polymer dye precursor and chemically bonding the reactive dye to the polymeric dye precursor to form a polymeric dye and thereby eliminating all or substantially all chemically reactive sites from the polymer dye precursor;

(e) providing an aqueous solution of a water-soluble polymer precursor that comprises crosslinkable groups;

(f) mixing the polymeric dye solution with the crosslinkable polymer precursor solution;

(g) introducing the mixture into a mold; and (h) applying sufficient radiation to initiate crosslinking of the crosslinkable polymer precursor to form a radiation-absorbing polymeric article.

It should be noted that, while the above ordering of processing steps is preferred, a person having ordinary skill in the art may modify or rearrange the steps and still fall within the spirit and scope of the invention. For example, the mixing of polymeric dye with polymerizable material prior to introduction into the mold is not required, i.e. the polymeric dye and polymerizable material may be dispensed into the mold separately or simultaneously, but without mixing.

B. Polymeric Dye

1. Reactive Dye

A variety of radiation-absorbing additives have been disclosed in the art. Preferred groups of radiation-absorbing additives for ophthalmic lens applications are those which absorb ultraviolet (UV) light and those which absorb visible light (i.e., dyes or tinting agents). While the invention may be described in certain passages herein with respect to a dye or tinting agent for convenience, the present invention is not limited to a particular radiation-absorbing agent or group of radiation-absorbing agents. Thus, the invention has utility in incorporating a wide variety of radiation-absorbing agents into polymeric materials. Accordingly, the radiation-absorbing agents described below are only exemplary and do not limit the scope of the present invention.

It should be noted that the invention is not limited to the incorporation of one dye into the material. For example, a UV light-absorbing dye and a visible light-absorbing dye may both be incorporated into a polymeric article in accordance with the present invention. Thus, a wide variety of polymeric dye combinations may be developed in accordance with the present invention.

A preferred group of UV absorbing agents are defined by the following formula:

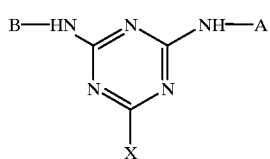

where

X is Cl or F, with Cl (chlorotriazines) preferred;

A is an ultraviolet radiation absorbing radical as defined below; and

B is an aqueous soluble moiety or an ultraviolet radiation absorbing radical as defined below.

The UV absorbing agent is preferably water soluble. Water soluble agents are especially preferred in order to provide UV absorbing agent distribution uniformity in an aqueous solution containing the polymer precursor, thereby allowing for uniform and efficient affixation of the UV absorbing agent to the polymer precursor.

The ultraviolet radiation absorbing radical (A and, in some cases, B) of the UV absorbing agent of the present invention may be chosen from a variety of compositions. Representative of such UV-absorbing materials are those disclosed in U.S. Pat. Nos. 3,041,330, 3,159,646, 3,213,058, 3,214,436, 3,399,173, 3,493,539, 4,418,000, 4,418,002, 4,826,978, 4,880,859, 4,929,250, 4,963,160 and 5,098,445, all of which are incorporated herein by reference. Thus, UV absorbing radicals useful in accordance with the present invention include benzoic acid esters, cyano and carbomethoxy acrylates, oxalic acid diamides, and hydroxyphenyltriazines.

The ultraviolet radiation absorbing radical may be selected from the group consisting of the following, without limitation thereto:

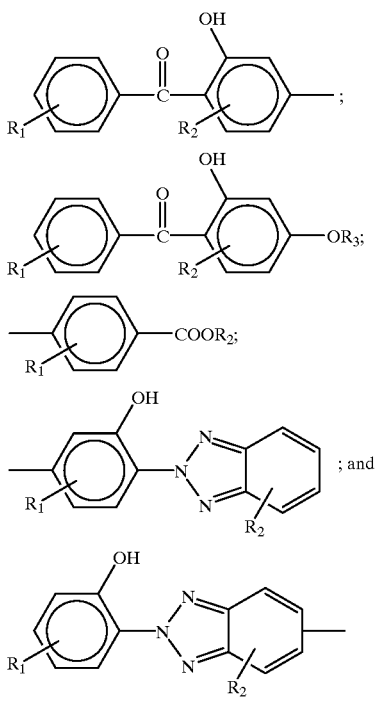

where $R_1$ and $R_2$ are selected from the group consisting of hydrogen, alkyl chains varying from $C_1$ to $C_{18}$, alkoxy, halogen, nitro, hydroxy, carboxy, sulfonic acid or sulfonic acid salt substituents.

Preferably an aqueous soluble moiety is used (i.e., group B), and a preferred group of aqueous soluble moieties are defined by the formula:

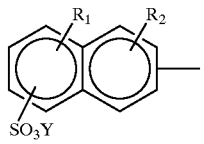

where Y is an amine salt or an alkali salt; $R_1$ and $R_2$ are selected from the group consisting of hydrogen, alkyl chains varying from $C_1$ to $C_{18}$, alkoxy, halogen, nitro, hydroxy, carboxy, sulfonic acid or sulfonic acid salt substituents.

A particularly preferred UV absorbing agent is 2-methoxy-4-hydroxy-5-[4-(2-(4-chloro-6-(4-carboxy-3-hydroxyphenylamino)triazinyl)amino)phenylcarbonyl] benzenesulfonic acid sodium salt ($C_{24}H_{17}N_5O_9ClNa$), which is disclosed more fully in U.S. Pat. No. 5,480,927, which is incorporated herein by reference.

The dyes (or tinting agents), e.g., visible light-absorbing agents, useful in accordance with the present invention include, without limitation thereto, agents having the following formula:

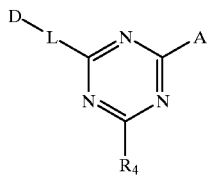

wherein D is an organic dyestuff radical, L is a bond or a divalent linking group, A is a halogen, and $R_4$ is an optional substituent. Preferably, A is fluoro or chloro, more preferably fluoro.

D is the radical of an organic dyestuff radical, including without limitation thereto, dyes described in the Color Index, Volume 5, Third Edition (Second Revision, 1982) and dyes described in U.S. Pat. No. 4,559,059, said patent being incorporated by reference. The radical D may advantageously be the radical of an azo, phthalocyanine, azomethine, nitro, or anthraquinone dye.

Among the types of reactive dyes suitable for use according to the invention, the following general classes may be mentioned: reactive dyes containing vinyl sulfone precursors, such as θ-sulfatoethylsulfonyl, θ-sulfatoethylsulfonamido, θ-hydroxyethylsulfonyl and θ-hydroxyethylsulfonamido substituents, as well as suitable derivatives thereof; dyes containing acryloylamino, θ-chloropropionylamino, and θ-sulfatopropionylamino and related reactive groups; dyes containing θ-phenylsulfonylpropionylamino groups; dyes containing θ-sulfato- or θ-chloroethylsulfamoyl groups; chloroacetyl dyes; I-bromoacryloyl dyestuffs; and a wide variety of other reactive dyes which have or are being developed for use in the dyeing of natural and synthetic fibers, in particular of cellulose and wool and function by nucleophilic addition.

Some examples of commercially available dyes suitable for use according to the invention include REMAZOL (Hoechst), LEVAFIX (Bayer), SOLIDAZOL (Cassella), LANASOL (Ciba) and CALCOBOND (American Cyanamid). Some preferred dyes include REMAZOL Yellow GR (Reactive Yellow 15, Registry Number CAS 60958-41-0); REMAZOL Turquoise P or RP (Reactive Blue 21, Registry Number CAS 73049-92-0) REMAZOL Black B (Reactive Black 5, Registry number CAS 17095-24-8); REMAZOL Golden Orange 3GA (Reactive Orange 78, Registry Number CAS 68189-39-9); and Rhodazol Brilliant Blue RW. A particularly preferred reactive dye is REMAZOL Reactive Blue 19.

The amount of dye necessary in a particular application depends on a number of factors. The dye is added in an amount sufficient to impart the desired color intensity for tinted (i.e. visible light absorbing) lenses. Generally, the weight percentage of dye, based on the total dehydrated contact lens weight, is about 0.0001% to about 1%. Preferably, the weight percentage of dye is about 0.001% to about 0.50%. More preferably, the weight percentage of dye is about 0.005% to about 0.25%.

2. Activation of Dye

Subsequent to, or prior to, addition of a dye to the polymeric dye precursor solution, and optional thorough mixing, activation of the agent is required to affix the agent to the polymer precursor. Activation typically entails generating an carbon-carbon double (i.e., unsaturated) bond on the dye. Activation is preferably accomplished by increasing the pH of the solution to a basic level for a time sufficient to drive the reaction of agent with polymer precursor to substantial completion. The pH may be raised to about 10 to about 14, preferably about 12 to about 14, more preferably about 12.5 to about 13.5 for a period of about 1 to about 30 minutes, preferably about 10 to about 20 minutes. Temperatures during the activation process are held at about 25 to 75° C., preferably about 30 to 50° C.

The pH may be increased by addition of a variety of basic activator compounds, including without limitation thereto, sodium hydroxide, sodium bicarbonate, potassium bicarbonate, sodium phosphate, potassium phosphate, tribasic sodium phosphate dodecahydrate, mixtures thereof, and the like. A preferred aqueous basic activator solution includes about 5 to about 15, preferably about 8 to about 12, weight percent tribasic sodium phosphate dodecahydrate, about 1 to about 5, preferably about 1 to 3, weight percent tetrabutyl ammonium bromide.

Reactive dyes which have already been activated may be commercially purchased. For example, UNIBLUE A sodium salt, which is an activated REMAZOL reactive blue 19 dye, may be purchased directly from Aldrich. Clearly, if an activated dye is used, the step of activating the dye, e.g. by increasing the pH, may be eliminated from the process.

3. Polymeric Dye Precursor

The polymeric dye precursors of the present invention include reactive groups for bonding with the reactive dye. These groups include, without limitation thereto, amino, hydroxyl, amido and mercapto groups which are external to the polymer backbone, preferably hydroxyl or amino groups. Polymers which do not include groups which are reactive with the reactive dye may be functionalized appropriately to facilitate bonding of dye to polymeric dye precursor. Thus, in theory, any polymeric material which may be functionalized in order to provide reactivity with a reactive dye may be used as a polymeric dye precursor.

The polymeric dye precursor has a molecular weight or a three-dimensional structure which is sufficiently large to cause the resultant polymeric dye to be physically entrapped within the polymeric matrix of the article to be produced. Thus, the limitation on the size and/or shape of the polymer precursor is primarily a functional limitation, i.e., there will be an insubstantial amount of polymeric dye that will leach out of the finished polymeric article. The determination of whether the amount of dye leached out of the lens is substantial depends primarily on ophthalmic compatibility (i.e., a substantial amount of leaching will not be allowed by regulatory bodies and/or will cause ocular irritation or damage).

The polymeric dye may be physically entrapped in the polymer matrix because at least one dimension of the three-dimensional shape is larger than the pore sizes of the finished article.

In terms of molecular weight, in a preferred embodiment, the polymeric dye precursor has a weight average molecular weight of at least about 2000. In another embodiment, the polymeric dye precursor has a weight average molecular weight of about 10,000 to about 300,000. In yet another embodiment, the polymeric dye precursor has a weight average molecular weight of about 50,000 to about 100,000.

The polymeric dye precursor may be formed from a wide range of monomers, oligomers and/or macromers. For ophthalmic lenses, the monomer groups of the polymeric material are preferably selected from the monomeric materials known to be useful in the formation of contact lenses, some of which are listed hereinafter. It is preferable, for compatibility purposes, to have the polymeric dye precursor and polymerizable or crosslinkable material formed from the same monomer or from compatible monomeric materials. A preferred polymeric dye precursor is a poly(vinyl alcohol), more detail for which is given hereinafter and in U.S. Pat. No. 5,508,317, issued to Beat Müller on Apr. 16, 1996, which is incorporated herein by reference.

In contrast to prior art techniques which teach reacting the dye to the polymer backbone of the finished article, the present method includes a step of affixing the dye to a relatively high molecular weight polymer precursor before forming the shaped article, i.e., before crosslinking. The resultant polymeric dye is then mixed with polymerizable or crosslinkable material (e.g. additional polymer precursor with crosslinkable groups), and subsequently, the polymer is formed (i.e., molded by crosslinking or polymerizing in a mold), thereby entrapping the polymeric dye. The polymeric dye is believed to be trapped in the crosslinked polymer matrix because of the physical size or entanglement, as opposed to being chemically bonded to the polymer backbone.

Tinting a contact lens by entrapping a polymeric dye during molding of the finished article offers the aforementioned advantages of reduced cycle time and elimination of steps which occur in-line and downstream of molding, e.g., the dye affixation step and extraction steps. However, in order to realize the full advantages of the invention, the polymeric dye should be of a size sufficient to allow all, or substantially all, of the polymeric dye to be physically entrapped in the polymer matrix during the crosslinking process. Accordingly, the above preferred weight average molecular weight ranges have been provided as a guide to tinted polymer precursor sizes which offer these advantages.

4. Formation of Polymeric Dye

The polymeric dye may be formed by mixing the activated reactive dye with the polymeric dye precursor. Alternatively, the reactive dye may be mixed with the polymeric dye precursor, and subsequently, the mixture may be activated (e.g., by addition of a base). Regardless of the ordering of the steps, the reactive groups on the dye bond (e.g., unsaturated carbon-carbon bonds) react with reactive groups on the polymeric dye precursor (e.g., hydroxyl groups) to form a polymeric dye. Preferably the reaction occurs in an aqueous solution, in order to avoid the need for extraction of solvents which are not ophthalmically compatible.

As with any chemical reaction, the reaction may not proceed to completion. Accordingly, the polymeric dye mixture may contain unreacted dye. In addition, the mixture may contain a ophthalmically incompatible solvent which must be removed prior to polymerization, or at least removed prior to packaging. Thus, the polymeric dye mixture is preferably subjected to one or more purification steps prior to mixing with the polymerizable or crosslinkable material or dispensing into the mold.

5. Purification of Polymeric Dye

The polymeric dye can be purified via a variety of processes. For example, the polymer dye may be purified by precipitation with organic solvents such as acetone, dialysis or ultrafiltration. Ultrafiltration is a preferred purification process. Purification of the polymeric dye can produce concentrated aqueous solutions that are free, or at least substantially free, from reaction products, such as salts, activation moieties, and from starting materials, such as, for example, unreacted or partially reacted dyes or other non-polymeric constituents.

The polymeric dye solutions may be subjected to repeated ultrafiltration processes, e.g., from two to about ten ultrafiltration processes. Alternatively, the ultrafiltration can be carried out continuously until the selected degree of purity is attained. A suitable measure for the degree of purity is, for example, the sodium chloride content of the solution.

The preferred solution of the polymeric dye used in the process according to the invention is one that comprises no, or substantially no, undesired constituents that would have to be extracted after a crosslinking operation. Undesirable constituents includes monomeric, oligomeric or polymeric starting compounds used for the preparation of the polymeric dye precursor or unreacted or partially reacted dye. Thus, the concentration of undesirable constituents after crosslinking is an amount which less than that which would cause ocular irritation or damage after normal use in the ocular environment. A particular feature of this preferred embodiment of the process according to the invention is that extraction of undesired constituents following molding (i.e., polymerization or crosslinking) is not necessary.

C. Crosslinkable or Polymerizable Material

Figure 4:
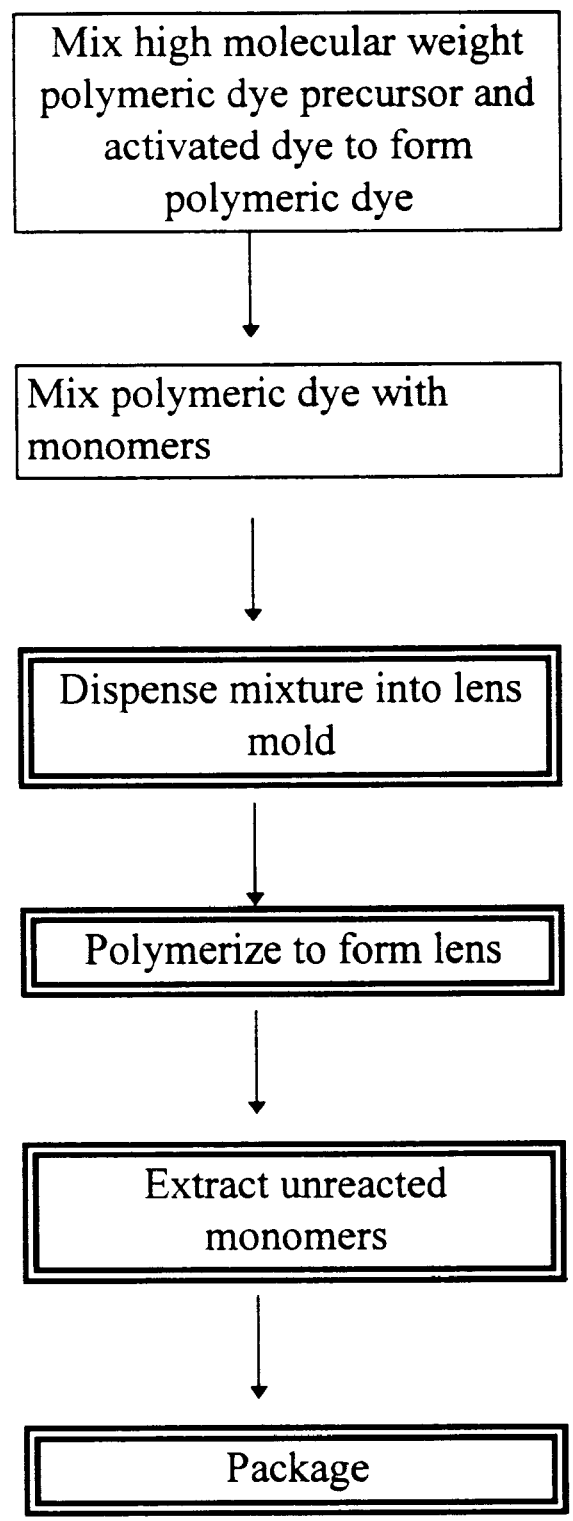
FIG. 4 is a schematic diagram of yet another embodiment of the present innovative process.

The present processes may be accomplished by mixing a polymeric dye with either polymerizable materials (e.g., monomers, oligomers or macromers) or crosslinkable materials, or mixtures thereof. FIGS. 2 and 3 show schematically the major steps in two embodiments of the invention in which polymeric dyes are mixed with crosslinkable polymer precursors, and the polymer precursors are crosslinked to mold the lens. FIG. 4 illustrates the major steps in an embodiment in which polymeric dyes are mixed with monomers, and the monomers are polymerized to mold the lens. However, it should be noted that, while not illustrated specifically in the Figures, mixtures of crosslinkable and polymerizable materials may be used. Also, while post-molding extraction steps are not desirable, extraction steps may be required in particular situations, especially in cases in which monomeric materials are used.

1. Polymerizable Materials

The polymerizable materials useful in accordance with the present invention include a wide variety materials known in the art. Preferred polymeric materials are those which are biocompatible, especially ophthalmically compatible, and which are translucent or transparent. A preferred polymeric material is a poly(vinyl alcohol). Suitable polymerizable or crosslinkable materials include, in addition to vinyl alcohol, those already proposed in some cases as contact lens materials, for example monomeric diols, monomers comprising saccharides, vinylpyrrolidone monomers, alkyl (meth)acrylate monomers, alkyl(meth)acrylate monomers that have been substituted by hydrophilic groups, such as by hydroxy, carboxy or by amino, alkylene glycols, or mixtures thereof. Examples of monomeric materials include, without limitation thereto, 2-hydroxyethyl methacrylate (HEMA), vinyl pyrrolidone (VP), methacrylic acid (MAA), ethyleneglycol dimethacrylate (EGDMA), and trimethylolpropane trimethacrylate (TMPTMA).

The use of the term monomer above is intended to be in the broad sense, i.e., monomer is intended to include low molecular weight monomers, intermediate molecular weight oligomers, high molecular weight macromers, and the like.

As noted, in a preferred embodiment the radiation-absorbing polymer precursor and the crosslinkable material with which it is mixed are both formed from the same material. However, a wide variety of hydrophilic and hydrophobic polymerizable or crosslinkable materials may be mixed and polymerized or crosslinked with the radiation-absorbing polymer precursor of the present invention.

Suitable vinylic monomers include especially those customarily used in the manufacture of contact lenses. As used herein, a hydrophilic vinylic monomer denotes a monomer that typically yields as homopolymer a polymer that can absorb at least 10% by weight of water. Analogously, as used herein, a hydrophobic vinylic monomer denotes a monomer that typically yields as homopolymer a polymer that can absorb less than 10% by weight of water.

Suitable hydrophobic vinylic monomers include, without the list being exhaustive, $C_1$–$C_{18}$ alkyl acrylates and methacrylates, $C_3$–$C_{18}$ alkyl acrylamides and methacrylamides, acrylonitrile, methacrylonitrile, vinyl-$C_1$–$C_{18}$ alkanoates, $C_2$–$C_{18}$ alkenes, $C_2$–$C_{18}$ haloalkenes, styrene, $C_1$–$C_6$ alkylstyrene, vinyl alkyl ethers, in which the alkyl moiety contains from 1 to 6 carbon atoms, $C_2$–$C_{10}$ perfluoroalkyl acrylates and methacrylates or correspondingly partially fluorinated acrylates and methacrylates, $C_3$–$C_{12}$ perfluoroalkyl-ethylthiocarbonylaminoethyl acrylates and methacrylates, acryloxy- and methacryloxy-alkylsiloxanes, N-vinylcarbazole, $C_1$–$C_{12}$ alkyl esters of maleic acid, fumaric acid, itaconic acid, mesaconic acid and the like. $C_1$–$C_4$ alkyl esters of vinylically unsaturated carboxylic acids having from 3 to 5 carbon atoms or vinyl esters of carboxylic acids having up to 5 carbon atoms, for example, are preferred.

Examples of suitable hydrophobic vinylic monomers include methyl acrylate, ethyl acrylate, propyl acrylate, isopropyl acrylate, cyclohexyl acrylate, 2-ethylhexyl acrylate, methyl methacrylate, ethyl methacrylate, propyl methacrylate, vinyl acetate, vinyl propionate, vinyl butyrate, vinyl valerate, styrene, chloroprene, vinyl chloride, vinylidene chloride, acrylonitrile, 1-butene, butadiene, methacrylonitrile, vinyltoluene, vinyl ethyl ether, perfluorohexylethylthiocarbonylaminoethyl methacrylate, isobornyl methacrylate, trifluoroethyl methacrylate, hexafluoroisopropyl methacrylate, hexafluorobutyl methacrylate, tristrimethylsilyloxy-silyl-propyl methacrylate, 3-methacryloxypropylpentamethyldisiloxane and bis(methacryloxypropyl)tetramethyldisiloxane. Preferred hydrophobic vinylic monomers are methyl methacrylate and vinyl acetate.

Suitable hydrophilic vinylic monomers include, without the limitation thereto, hydroxy-substituted lower alkyl acrylates and methacrylates, acrylamide, methacrylamide, lower alkyl acrylamides and methacrylamides, ethoxylated acrylates and methacrylates, hydroxy-substituted lower alkyl acrylamides and methacrylamides, hydroxy-substituted lower alkyl vinyl ethers, sodium ethylenesulfonate, sodium styrenesulfonate, 2-acrylamido-2-methylpropanesulfonic acid, N-vinylpyrrole, N-vinylsuccinimide, N-vinylpyrrolidone, 2- or 4-vinylpyridine, acrylic acid, methacrylic acid, amino- (the term "amino" also including quaternary ammonium), mono-lower alkylamino- or di-lower alkylamino-lower alkyl acrylates and methacrylates, allyl alcohol and the like. Hydroxy-substituted C2–C4alkyl(meth)acrylates, five- to seven-membered N-vinyl lactams, N,N-di-C1–C4alkyl(meth) acrylamides and vinylically unsaturated carboxylic acids having a total of from 3 to 5 carbon atoms, for example, are preferred.

Examples of suitable hydrophilic vinylic monomers include hydroxyethyl methacrylate, hydroxyethyl acrylate, acrylamide, methacrylamide, dimethylacrylamide, allyl alcohol, vinylpyridine, vinylpyrrolidone, glycerol methacrylate, N-(1,1-dimethyl-3-oxobutyl)acrylamide, and the like. Preferred hydrophilic vinylic monomers are 2-hydroxyethyl methacrylate, N-vinylpyrrolidone and acrylamide.

2. Crosslinkable Polymer Precursor

The polymer precursor used in accordance with the invention includes polymerizable or crosslinkable groups, preferably crosslinkable groups. "Crosslinkable groups" denotes customary crosslinkable groups well-known to the person skilled in the art, such as, for example, photocrosslinkable or thermally crosslinkable groups. Crosslinkable groups such as those already proposed for the preparation of contact lens materials are especially suitable. Those include especially, but not exclusively, groups comprising carbon-carbon double bonds. To demonstrate the large variety of suitable crosslinkable groups, there are mentioned here, merely by way of example, the following crosslinking mechanisms: radical polymerisation, 2+2 cyclo-addition, Dieis-Alder reaction, ROMP (Ring Opening Metathesis Polymerisation), vulcanisation, cationic crosslinking and epoxy hardening.

Suitable water-soluble polymer precursors that comprise crosslinkable groups are, for example, compounds comprising units of formula I. It is also possible, however, to use in the process other water-soluble polymer precursors that comprise a polymeric backbone and also crosslinkable groups.

The polymer precursor used in accordance with the invention preferably comprises crosslinkable groups in an amount of from approximately 0.5 to approximately 80% equivalents, based on the equivalents of monomers that form the polymeric backbone, especially approximately from 1 to 50%, preferably approximately from 1 to 25%, preferably approximately from 2 to 15% and especially preferably approximately from 3 to 10%. Also especially preferred are amounts of crosslinkable groups of from approximately 0.5 to approximately 25% equivalents, especially approximately from 1 to 15% and especially preferably approximately from 2 to 12%, based on the equivalents of monomers that form the polymeric backbone.

As already mentioned, one preferred criterion for the suitability of a polymer precursor for the process according to the invention is that it is a crosslinkable polymer precursor, but the polymer precursor is uncrosslinked, or at least substantially uncrosslinked, so that it is water-soluble.

In addition, the polymer precursor is advantageously stable in the uncrosslinked state, so that it can be subjected to purification as described hereinbefore in connection with compounds comprising units of formula I. The polymer precursors are preferably used in form of a pure solution in the process according to the invention. The polymer precursors can be converted into the form of a pure solution for example in the manner disclosed hereinafter.

a. Preferred Polymer Precursor

A particularly preferred class of polymeric materials is poly(vinyl alcohols), especially those disclosed in U.S. Pat. No. 5,508,317, issued to Beat Mëller on Apr. 16, 1996 and assigned to Ciba-Geigy Corporation. The disclosure of U.S. Pat. No. 5,508,317 is hereby incorporated by reference. The preferred group of polymer precursors of polyvinyl alcohols includes derivatives of polyvinyl alcohol having a weight-average molecular weight of at least about 2000 that, based on the number of hydroxy groups of the polyvinyl alcohol, include from about 0.5% to about 80% of units of formula I:

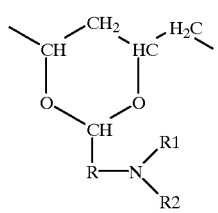

(I)

wherein:

R is lower alkylene having up to 8 carbon atoms,

R1 is hydrogen or lower alkyl, and

R2 is an olefinically unsaturated, electron-attracting copolymerizable radical, preferably having up to 25 carbon atoms, preferably an olefinically unsaturated acyl radical of the formula R3—CO—, in which R3 is an olefinically unsaturated copolymerisable radical having from 2 to 24 carbon atoms, preferably from 2 to 8 carbon atoms, especially preferably from 2 to 4 carbon atoms.

It should be noted that molecular weights, as used herein, are weight average molecular weights, Mw, unless otherwise specified.

In another embodiment, the radical R2 is a radical of the formula II:

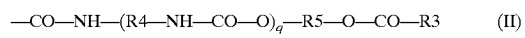

—CO—NH—(R4—NH—CO—O)$_q$—R5—O—CO—R3  (II)

where:

q is zero or one,

R4 and R5 are each independently lower alkylene having from 2 to 8 carbon atoms, arylene having from 6 to 12 carbon atoms, a saturated divalent cycloaliphatic group having from 6 to 10 carbon atoms, arylenealkyene or alkylenearylene having from 7 to 14 carbon atoms or arylenealkyenearlyene having from 13 to 16 carbon atoms, and R3 is as defined above.

A more preferred polymer precursor useful in accordance with the present invention is a derivative of a polyvinyl alcohol having a weight average molecular weight of at least about 2000 that, based on the number of hydroxyl groups of the polyvinyl alcohol, includes from about 0.5% to about 80% of units of formula III:

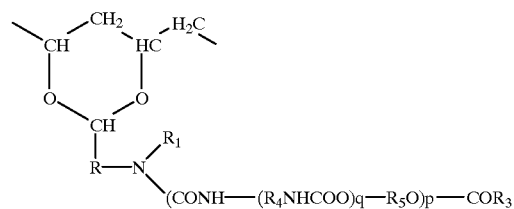

(III)

where:

R is lower alkylene, $R_1$ is hydrogen or lower alkyl, p is zero or one, q is zero or one, $R_3$ is an olefinically unsaturated copolymerisable radical having from 2 to 8 carbon atoms, and $R_4$ and $R_5$ are each, independently of the other, lower alkylene having from 2 to 8 carbon atoms, arylene having from 6 to 12 carbon atoms, a saturated divalent cycloaliphatic group having from 7 to 14 or arylene-alkylenearylene having from 13 to 16 carbon atoms.

Lower alkylene R preferably has up to 8 carbon atoms and may be straight-chained or branched. Suitable examples include octylene, hexylene, pentylene, butylene, propylene, ethylene, methylene, 2-propylene, 2-butylene and 3-pentylene. Preferably lower alkylene R has up to 6 and especially preferably up to 4 carbon atoms. The meanings methylene and butylene are especially preferred.

$R_1$ is preferably hydrogen or lower alkyl having up to seven, especially up to four, carbon atoms, especially hydrogen.

Lower alkylene $R_4$ or $R_5$ preferably has from 2 to 6 carbon atoms and is especially straight-chained. Suitable examples include propylene, butylene, hexylene, dimethylethylene and, especially preferably, ethylene.

Arylene $R_4$ or $R_5$ is preferably phenylene that is unsubstituted or is substituted by lower alkyl or lower alkoxy, especially 1,3-phenylene or 1,4-phenylene or methyl-1,4-phenylene.

A saturated divalent cycloaliphatic group $R_4$ or $R_5$ is preferably cyclohexylene or cyclohexylene-lower alkylene, for example cyclohexylenemethylene, that is unsubstituted or is substituted by one or more methyl groups, such as, for example, trimethylcyclohexylenemethylene, for example the divalent isophorone radical.

The arylene unit of alkylenearylene or arylenealkylene $R_4$ or $R_5$ is preferably phenylene, unsubstituted or substituted by lower alkyl or lower alkoxy, and the alkylene unit thereof is preferably lower alkylene, such as methylene or ethylene, especially methylene. Such radicals $R_4$ or $R_5$ are therefore preferably phenylenemethylene or methylenephenylene.

Arylenealkylenearylene $R_4$ or $R_5$ is preferably phenylene-lower alkylene-phenylene having up to 4 carbon atoms in the alkylene unit, for example phenyleneethylenephenylene.

The radicals $R_4$ and $R_5$ are each, independently of the other, preferably lower alkylene having from 2 to 6 carbon atoms, phenylene, unsubstituted or substituted by lower alkyl, cyclohexylene or cyclohexylene-lower alkylene, unsubstituted or substituted by lower alkyl, phenylene-lower alkylene, lower alkylene-phenylene or phenylene-lower alkylene-phenylene.

As used herein, the term "lower", as used in connection with radicals and compounds, denotes radicals or compounds having up to 7 carbon atoms, preferably up to 4 carbon atoms, unless defined otherwise. Lower alkyl has especially up to 7 carbon atoms, preferably up to 4 carbon atoms, and is, for example, methyl, ethyl, propyl, butyl or tert-butyl. Similarly, lower alkoxy has especially up to 7 carbon atoms, preferably up to 4 carbon atoms, and is, for example, methoxy, ethoxy, propoxy, butoxy or tert-butoxy.

The olefinically unsaturated copolymerisable radical $R_3$ is preferably alkenyl having from 2 to 24 carbon atoms, especially alkenyl having from 2 to 8 carbon atoms and especially preferably alkenyl having from 2 to 4 carbon atoms, for example ethenyl, 2-propenyl, 3-propenyl, 2-butenyl, hexenyl, octenyl or dodecenyl. $R_3$ is preferably ethenyl and 2-propenyl, so that the group —CO—$R_3$ is the acyl radical of acrylic or methacrylic acid.

The divalent group —$R_4$—NH—CO—O— is present when q is one and absent when q is zero. Polymer precursors in which q is zero are preferred.

The divalent group —CO—NH—($R_4$—NH—CO—O)$_q$—$R_5$—O— is present when p is one and absent when p is zero. Polymer precursors in which p is zero are preferred.

In polymer precursors in which, p is one the index q is preferably zero. Polymer precursors in which p is one, the index q is zero and $R_5$ is lower alkylene are especially preferred.

A preferred polymer precursor according to the invention is therefore especially a derivative of a polyvinyl alcohol having a molecular weight of at least about 2000 that, based on the number of hydroxy groups of the polyvinyl alcohol, comprises from approximately 0.5 to approximately 80% of units of formula III in which R is lower alkylene having up to 6 carbon atoms, p is zero and $R_3$ is alkenyl having from 2 to 8 carbon atoms.

A further preferred polymer precursor according to the invention is a derivative of a polyvinyl alcohol having a molecular weight of at least about 2000 that, based on the number of hydroxy groups of the polyvinyl alcohol, comprises from approximately 0.5 to approximately 80% of units of formula III in which R is lower alkylene having up to 6 carbon atoms, p is one, q is zero, $R_5$ is lower alkylene having from 2 to 6 carbon atoms and $R_3$ is alkenyl having from 2 to 8 carbon atoms.

Yet a further preferred polymer precursor according to the invention is a derivative of a polyvinyl alcohol having a molecular weight of at least about 2000 that, based on the number of hydroxy groups of the polyvinyl alcohol, comprises from approximately 0.5 to approximately 80% of units of formula III in which R is lower alkylene having up to 6 carbon atoms, p is one, q is one, $R_4$ is lower alkylene having from 2 to 6 carbon atoms, phenylene, unsubstituted or substituted by lower alkyl, cyclohexylene or cyclohexylene-lower alkylene, unsubstituted or substituted by lower alkyl, phenylene-lower alkylene, lower alkylene-phenylene or phenylene-lower alkylene-phenylene, $R_5$ is lower alkylene having from 2 to 6 carbon atoms and $R_3$ is alkenyl having from 2 to 8 carbon atoms.

The polymer precursors according to the invention are preferably derivatives of polyvinyl alcohol having a molecular weight of at least about 2000 that, based on the number of hydroxy groups of the polyvinyl alcohol, comprises from approximately 0.5 to approximately 80%, especially approximately from 1 to 50%, preferably approximately from 1 to 25%, preferably approximately from 2 to 15% and especially preferably approximately from 3 to 10%, of units of formula III. Polymer precursors according to the invention which are provided for the manufacture of contact lenses comprise, based on the number of hydroxy groups of the polyvinyl alcohol, especially from approximately 0.5 to approximately 25%, especially approximately from 1 to 15% and especially preferably approximately from 2 to 12%, of units of formula III.

Polyvinyl alcohols that can be derivatized in accordance with the invention preferably have a weight average molecular weight of at least 10,000. As an upper limit the polyvinyl alcohols may have a molecular weight of up to 1,000,000. Preferably, the polyvinyl alcohols have a molecular weight of up to 300,000, especially up to approximately 100,000 and especially preferably up to approximately 50,000.

Polyvinyl alcohols suitable in accordance with the invention usually have a poly(2-hydroxy)ethylene structure. The polyvinyl alcohols derivatised in accordance with the invention may, however, also comprise hydroxy groups in the form of 1,2-glycols, such as copolymer units of 1,2-dihydroxyethylene, as may be obtained, for example, by the alkaline hydrolysis of vinyl acetate/vinylene carbonate copolymers.

In addition, the polyvinyl alcohols derivatized in accordance with the invention may also comprise small proportions, for example up to 20%, preferably up to 5%, of copolymer units of ethylene, propylene, acrylamide, methacrylamide, dimethacrylamide, hydroxyethyl methacrylate, methyl methacrylate, methyl acrylate, ethyl acrylate, vinylpyrrolidone, hydroxyethyl acrylate, allyl alcohol, styrene or similar customarily used comonomers.

Commercially available polyvinyl alcohols may be used, such as, for example, Vinol® 107 produced by Air Products (MW=22,000 to 31,000, 98–98.8% hydrolysed), Polysciences 4397 (MW=25,000, 98.5% hydrolysed), BF 14 produced by Chan Chun, Elvanol® 90-50 produced by DuPont, UF-120 produced by Unitika, Mowiol® 3-83, 4-88, 10-98 and 20-98 produced by Hoechst. Other manufacturers are, for example, Nippon Gohsei (Gohsenol®), Monsanto (Gelvatol®), Wacker (Polyviol(®) and the Japanese manufacturers Kuraray, Denki and Shin-Etsu. The molecular weights referenced herein are weight average weights, Mw, determined by gel permeation chromatography, unless otherwise specified.

As already mentioned, it is also possible to use copolymers of hydrolysed vinyl acetate, which are obtainable, for example, in the form of hydrolysed ethylene/vinyl acetate (EVA), or vinyl chloride/vinyl acetate, N-vinylpyrrolidone/vinyl acetate and maleic acid anhydride/vinyl acetate.

Polyvinyl alcohol is usually prepared by hydrolysis of the corresponding homopolymeric polyvinyl acetate. In a preferred embodiment, the polyvinyl alcohol derivatised in accordance with the invention comprises less than 50% of polyvinyl acetate units, especially less than 20% of polyvinyl acetate units. Preferred amounts of residual acetate units in the polyvinyl alcohol derivatised in accordance with the invention, based on the sum of vinyl alcohol units and acetate units, are approximately from 3 to 20%, preferably approximately from 5 to 16% and especially approximately from 5 to 10%.

The compounds comprising units of formula III may be prepared in a manner known per se. For example, a polyvinyl alcohol having a molecular weight of at least about 2000 that comprises unit of formula IV

—CH(OH)—CH2—           (IV)

may be reacted with approximately from 0.5 to 80%, based on the number of hydroxy groups of the compound of formula IV, of a compound of formula (V)

(V)
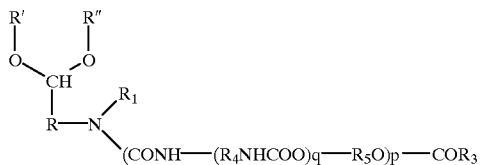

where R' and R are each, independently of the other, hydrogen, lower alkyl or lower alkanoyl, such as acetyl or propionyl, and the other variables are as defined for formula III, especially in an acidic medium.

Alternatively, a polyvinyl alcohol having a molecular weight of at least about 2000 that comprises units of formula IV may be reacted with a compound of formula VI (VI)
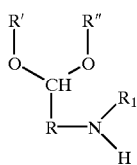

in which the variables are as defined for the compound of formula V, especially under acidic conditions, and the cyclic acetal obtainable in that manner may then be reacted with a compound of formula VII

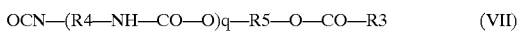
OCN—(R4—NH—CO—O)q—R5—O—CO—R3   (VII)

in which the variables are as defined for the compound of formula V.

Alternatively, the product obtainable as described above from a compound of formula IV and a compound of formula VI may be reacted with a compound of formula (VIII)

X—CO—R3           (VIII)

in which $R_3$ is, for example, alkenyl having from 2 to 8 carbon atoms and X is a reactive group, for example etherified or esterified hydroxy, for example halogen, especially chlorine.

Compounds of formula V in which p is zero are known, for example, from European Patent No. EP 201 693. Compounds of formula VI are also described therein. Compounds of formula VII are known per se, or can be prepared in a manner known per se. An example of a compound of formula VII in which q is zero is isocyanatoethyl methacrylate. An example of a compound of formula VII in which q is one is the reaction product of isophorone diisocyanate with 0.5 equivalent of hydroxyethyl methacrylate. Compounds of formula VIII are known per se; a typical representative is methacryloyl chloride. Compounds of formula V in which p and/or q are 1 can be prepared in a manner known per se from the abovementioned compounds, for example by reaction of a compound of formula VI with isocyanatoethyl methacrylate or by reaction of a compound of formula VI with isophorone diisocyanate which has previously been terminated with 0.5 equivalent of hydroxyethyl methacrylate.

Surprisingly, the polymer precursors of formulae I and III are extraordinarily stable. This is unexpected for the person skilled in the art because, for example, higher-functional acrylates usually have to be stabilised. If such compounds are not stabilised then rapid polymerisation usually occurs. Spontaneous crosslinking by homopolymerisation does not occur, however, with the polymer precursors of the invention.

b. Polymer Precursor Molecular Weight

In a preferred embodiment, the polymer precursor has a weight average molecular weight of at least about 2000. Preferably, however, the polymer precursor has a weight average molecular weight of from approximately 10,000 to approximately 300,000. A more preferred weight average molecular weight of the polymer precursor mixtures is about 10,000 to about 200,000. Even more preferred is a weight average molecular weight of about 50,000 to about 100,000. Additional discussion regarding preparation of polymer precursor may be found in U.S. Pat. No. 5,508,317, issued to Beat Müller on Apr. 16, 1996, which is hereby incorporated by reference.

The size of the polymer precursor, described here in terms of weight average molecular weight, is important for reducing cycle time. The process of crosslinking polymer precursors having relatively large molecular weights is much faster than polymerization of monomers. This increased speed of formation of the final article, e.g. contact lens, translates into an increased production rate and lower costs per product unit. These advantages are explored more fully in U.S. Pat. No. 5,508,317, issued to Beat Müller on Apr. 16, 1996 c. Polymer Precursor Water Solubility

In accordance with a preferred embodiment of the invention, the criterion that the polymer precursor is soluble in water denotes in particular that the polymer precursor is soluble in a concentration of approximately from 3 to 90% by weight, preferably approximately from 5 to 60% by weight, especially approximately from 10 to 60% by weight, in a substantially aqueous solution. Insofar as it is possible in an individual case, polymer precursor concentrations of more than 90% are also included in accordance with the invention. Especially preferred concentrations of the polymer precursor in solution are from approximately 15 to approximately 50% by weight, especially from approximately 15 to approximately 40% by weight, for example from approximately 25% to approximately 40% by weight.

Within the scope of this invention, substantially aqueous solutions of the polymer precursor comprise especially solutions of the polymer precursor in water, in aqueous salt solutions, especially in aqueous same solutions that have an osmolarity of approximately from 200 to 450 milliosmol per 1000 ml (unit: mOsm/l), preferably an osmolarity of approximately from 250 to 350 mOsm/l, especially approximately 300 mOsm/l, or in mixtures of water or aqueous salt solutions with physiologically tolerable polar organic solvents, such as, for example, glycerol. Solutions of the polymer precursor in water or in aqueous salt solutions are preferred.

The aqueous salt solutions are advantageously solutions of physiologically tolerable salts, such as buffer salts customary in the field of contact lens care, for example phosphate salts, or isotonising agents customary in the field of contact lens care, such as, especially, alkali halides, for example sodium chloride, or solutions of mixtures thereof. An example of an especially suitable salt solution is an artificial, preferably buffered, lacrimal fluid that in respect of pH value and osmolarity is adapted to natural lacrimal fluid, for example a sodium chloride solution that is unbuffered or that is preferably buffered, for example, by phosphate buffer, and that has an osmolarity that corresponds to the osmolarity of human lacrimal fluid.

The substantially aqueous solution of the polymer precursor defined above is preferably a pure solution which means a solution which is free or essentially free from undesired constituents. Especially preferred examples of such solutions are a solution of the polymer precursor in pure water or in an artificial lacrimal fluid, as defined hereinbefore. The viscosity of the solution of the polymer precursor in the substantially aqueous solution is, within wide limits, not critical, but the solution should preferably be a flowable solution that can be deformed strain-free.

d. Advantages of the Preferred Materials

Attention may also be drawn to the fact that the contact lenses according to the invention, which means especially those comprising a radiation-absorbing polymer based on a polymer precursor comprising units of formula I, can be produced in a very simple, efficient and inexpensive manner compared with the state of the art.

The preferred polymer precursor materials offer a variety of advantages. First, the starting materials can be obtained or produced at a favorable cost. Second, there is the advantage that the polymer precursors are surprisingly stable, so that they can be subjected to a high degree of purification. It is therefore possible to use for the crosslinking a polymer precursor that requires practically no purification subsequent to crosslinking or polymerization. Also, the polymerization can be carried out in aqueous solution, so that a subsequent hydration step is not necessary. Finally, the photopolymerization occurs within a short period, so that the process for manufacturing the contact lenses has a reduced cycle time and is less costly.

All of the advantages mentioned above naturally apply not only to contact lenses but also to other moldings according to the invention. Taking into account all the various advantageous aspects in the manufacture of the moldings according to the invention it can be seen that the moldings according to the invention are especially suitable as mass-produced articles, such as, for example, contact lenses that are worn for a short time and then replaced by new lenses (e.g., daily disposable lenses).

3. Comonomers

It is preferable to carry out the crosslinking process according to the invention without the addition of a comonomer, for example a vinylic comonomer. The vinylic comonomer which, in accordance with the invention, may be used in addition in the photocrosslinking, may be hydrophilic or hydrophobic, or a mixture of a hydrophobic and a hydrophilic vinylic monomer. Examples of suitable comonomers are disclosed herein above.

Generally, approximately from 0.01 to 80 units of a typical vinylic comonomer react per unit of formula I or III. If a vinylic comonomer is used, the crosslinked polymers according to the invention preferably comprise approximately from 1 to 15%, especially preferably approximately from 3 to 8%, of units of formula I or III, based on the number of hydroxy groups of the polyvinyl alcohol, which are reacted with approximately from 0.1 to 80 units of the vinylic monomer.

The proportion of the vinylic comonomers, if used, is preferably from 0.5 to 80 units per unit of formula I, especially from 1 to 30 units per unit of formula I, and especially preferably from 5 to 20 units per unit of formula I.

It is also preferable to use a hydrophobic vinylic comonomer or a mixture of a hydrophobic vinylic comonomer with a hydrophilic vinylic comonomer, the mixture comprising at least 50% by weight of a hydrophobic vinylic comonomer. In that manner the mechanical properties of the polymer can be improved without the water content falling substantially. In principle, however, both conventional hydrophobic vinylic comonomers and conventional hydrophilic vinylic comonomers are suitable for the copolymerisation with polyvinyl alcohol comprising groups of formula I.

4. Solvents

The photopolymerization is preferably carried out in a solvent. The solvents useful in the present processes depend on the specific polymerizable or crosslinkable materials, i.e., polymer precursors, oligomers, macromers or monomers, which are selected. In the event that conventional hydrogel-forming monomers are used, useful solvents may be selected from those well known in the art. A suitable solvent for the preferred poly(vinyl alcohols) is any solvent that dissolves the preferred polyvinyl alcohol and the vinylic comonomers optionally used in addition, for example water, alcohols, such as lower alkanols, for example ethanol or methanol, also carboxylic acid amides, such as dimethylformamide, or dimethyl sulfoxide, and also a mixture of suitable solvents, such as, for example, a mixture of water with an alcohol, such as, for example, a water/ethanol or a water/methanol mixture. The substantially aqueous solution is more preferably a pure aqueous solution or a solution in an artificial lacrimal fluid.

5. Photoinitiators

In the case of photocrosslinking, it is appropriate to add a crosslinking initiator (preferably a photoinitiator for photocrosslinking) which can initiate crosslinking. The photoinitiator may be added to the first or second polymer precursor solution, or to the mixture of the first and second polymer precursor solution. A reasonable amount of mixing is preferred to distribute the photoinitiator substantially uniformly throughout the polymer precursor solution. Examples thereof are familiar to the person skilled in the art and suitable photoinitiators that may be mentioned specifically are benzoin methyl ether, 1-hydroxycyclohexylphenyl ketone, alkylaryl ketones such as and DAROCUR® or IRGACUREtypes, e.g. DAROCUR® 1173 or IRGACURE2959, available from Ciba-Geigy Corporation (Ardsley, N.Y.). The crosslinking can then be triggered by actinic radiation, such as, for example, UV light, or ionising radiation, such as, for example, gamma radiation or X-radiation.

6. Purification

The preferred polymer precursors of formulae I and III can furthermore be purified via a variety of processes. For example, the polymer precursors may be purified by precipitation with organic solvents such as acetone, dialysis or ultrafiltration. Ultrafiltration is a preferred purification process. Purification of the polymer precursors can produce concentrated aqueous solutions that are free, or at least substantially free, from reaction products, such as salts, and from starting materials, such as, for example, compounds of formula V or other non-polymeric constituents.

The polymer precursor solutions may be subjected to repeated ultrafiltration processes, e.g., from two to about ten ultrafiltration processes. Alternatively, the ultrafiltration can be carried out continuously until the selected degree of purity is attained. A suitable measure for the degree of purity is, for example, the sodium chloride content of the solution.

The preferred solution of the polymer precursor used in the process according to the invention is one that comprises no, or substantially no, undesired constituents that would have to be extracted after a crosslinking operation. Undesirable constituents includes monomeric, oligomeric or polymeric starting compounds used for the preparation of the polymer precursor. Thus, the concentration of undesirable constituents after crosslinking is an amount which less than that which would cause ocular irritation or damage after normal use in the ocular environment. A particular feature of this preferred embodiment of the process according to the invention is that extraction of undesired constituents following crosslinking is not necessary.

D. Molding Process

1. General Description

The present invention is directed to a radiation-absorbing polymeric article that can be obtained by crosslinking or polymerizing (e.g., molding) a crosslinkable or polymerizable material in the presence of a radiation-absorbing high molecular weight polymer precursor, in the absence or presence of an additional vinylic comonomer. The resulting polymers are preferably water-insoluble. For example, the polymer precursors of formulas I and III are crosslinkable in an extremely effective and controlled manner, especially by photocrosslinking, i.e., crosslinking initiated by application of radiation, such as ultraviolet or visible light.

The contact lenses according to the invention can be molded, for example, in a manner known in the art, for example in a conventional "spin-casting mold", as described, for example, in U.S. Pat. No. 3,408,429, or by the so-called double-sided molding (DSM) or full-mold process in a static mold, as described, for example, in U.S. Pat. No. 4,347,198. Methods that are known for conventional metering in, for example by dropwise introductions, may be used to introduce the resulting solution into a mold.

The polymeric dye and polymerizable (or crosslinkable) mixture according to the invention can be processed in a manner known in the art into moldings, especially contact lenses. For example, the polymeric dye/polymerizable material mixture can be dispensed into a mold, then the mold can be closed, and photocrosslinking or polymerizing of the polymerizable or crosslinkable material can be initiated by application of sufficient radiation. Ultraviolet light is a preferred radiation. For example, an aqueous solution of approximately 15 to 40 weight percent crosslinkable polymer precursor, in the presence of polymeric dye, can be photocrosslinked.

In this process, if a double-sided mold is used, at least a portion of at least one of the mold halves must be at least partially transparent to the light applied. Suitable molds are generally customary contact lens molds as known in the state of the art. Appropriate molds are made, for example, from polypropylene. Quartz, sapphire glass and metals, for example, are suitable materials for re-usable molds.

For compatibility reasons, the polymeric dye precursor and the polymerizable material are preferably formed from the same monomers (e.g., a vinyl alcohol). Thus, the process for the preparation of the polymers of the invention may comprise, for example, photocrosslinking a polymer precursor comprising units of formula I or III in the presence of a polymeric dye which is a polymer precursor comprising units of formula I or III having radiation-absorbing moieties affixed to the reactive groups. Preferably both the polymeric dye and crosslinkable polymer precursor are in substantially pure form (e.g., after single or repeated ultrafiltration), and preferably in solution (especially aqueous solution), and preferably in the absence (but optionally in the presence) of an additional vinylic comonomer.

It should be noted that the preparation of the first solution of polymer precursor and the preparation of the second solution of polymer precursor may be accomplished in one step. Subsequent to polymer precursor solution preparation, a portion of the polymer precursor solution may be reacted with radiation-absorbing agent, while the remainder may be reserved for crosslinking to form the solid ophthalmic lens.

The relative weight ratios of the polymeric dye to the crosslinkable or polymerizable material may vary substantially, and are primarily dependant upon the specific materials and dye selected, the desired final product dimensions and visible and/or ultraviolet light transmission. The weight percentage of polymeric dye of the total (i.e., polymeric dye and polymerizable or crosslinkable material) in solution may be about 0.01% to about 50%. Preferably, the weight percentage is about 0.05% to about 20%. More preferably, the weight percentage is about 0.1% to about 10%. Even more preferably, the weight percentage is about 0.5% to 5%. Most preferably, the weight percentage is about 1% to 3%.

2. Initiation of Crosslinking or Polymerization

Crosslinking may be accomplished by applying radiation to the polymer precursor mixture. Suitable forms of radiant energy which may trigger crosslinking, under appropriate conditions, include ultraviolet (UV) light, gamma radiation and X-ray radiation. Thus, the step of crosslinking preferably consists of applying radiation in an amount sufficient to cause crosslinking. The step of crosslinking occurs in the minimal amount of time possible to form a solid polymeric article. In the case of ophthalmic lenses, the step of crosslinking preferably occurs in a period of about 5 seconds to about 30 minutes, more preferably about 5 seconds to about 5 minutes, even more preferably about 5 seconds to about one minute, and most preferably about 5 seconds to about 30 seconds.

The crosslinking can be triggered in the mold, for example by actinic radiation, such as, for example, UV light, or by ionising radiation, such as, for example, gamma radiation, electron radiation or X radiation. The crosslinking can where appropriate also be triggered thermally. Attention is drawn to the fact that the crosslinking can be carried out according to the invention in a very short time, for example in less than five minutes, preferably in less than one minute, especially in up to 30 seconds, especially preferably, as disclosed in the examples.

The previous disclosure will enable one having ordinary skill in the art to practice the invention. In order to better enable the reader to understand specific embodiments and the advantages thereof, reference to the following examples is suggested.

EXAMPLE 1

Preparation of Amino-Functional Polymeric Dye Precursor

About 400 g. of MOWIOL 3-83 (Hoechst) polyvinyl alcohol (PVA) is dispersed in about 1985 g. of deionized water. The PVA is dissolved by heating for one hour at about 90° C., then the solution is cooled to about 25° C.

About 15 g. of aminobutylaldehyde diethylacetate and about 266 g. of HCl (37% concentration) are added to this solution. After stirring for about 12 hours at about 25° C., the solution is neutralized with 924.1 g. of 15% sodium hydroxide. The product is filtered over a 0.45 micron filter and purified by ultrafiltration over a 1 KD-membrane (Prep/Scale-TFF 2.5 ft$^2$ cartridge PLAC 1k regenerated cellulose, Cat P4SM9853 03 Millipore) until the sodium chloride content of the product is less than about 0.006%.

The polymeric dye precursor product is about 1641 g. of a 20.69% polymer solution having inherent viscosity of 0.372 dl/g., a N percent of 0.332, 7.59 mol percent acetate (1.569 meq/g.), and amino content of 2.29 mol percent (0.237 meq/g.).

EXAMPLE 2

Preparation of Polymeric Dye from Amino-Functional Polymeric Dye Precursor

About 0.488 g. UNIBLUE A activated reactive dye (from Aldrich) is dissolved in about 5 ml water. The dye solution is mixed with about 20 g. of a 20.69% polymeric dye precursor solution (from Example 1). About 3 g. of a 10% sodium carbonate soultion is added to the dye/polymeric dye precursor solution to achieve a pH of about 9.9. The solution is heated to about 40° C. and the pH is adjusted to about 10.5 with 1N sodium hydroxide. After about 15 minutes, the solution is neutralized with 3 N HCl.

The polymeric dye product is isolated by precipitation in about 900 g. of acetone with vigorous agitation. A yield of about 95.3% is calculated from the absorption measurement of the product and the mother liquid. About 4.75 g. of dark blue water soluble polymer dye results. Dissolution in water and reprecipitation in acetone does not produce a significant loss of blue dye.

EXAMPLE 3

Preparation of Polymeric Dye from Hydroxyl Functional Polymeric Dye Precursor

About 4.54 grams (0.1 equivalent hydroxyl groups) of MOWIOL 10-98 polyvinyl alcohol (from Hoechst), about 2.91 grams (about 11 mmol) of 18-Crown-6 Ether (from Fluka) and about 0.62 grams potassium hydroxide (from Merck) is added to about 30 milliliters (ml) dimethylsulfoxide (DMSO) solvent. About 2.6 grams (about 5.1 mmol) of UNIBLUE A sodium salt (activated REMAZOL reactive blue 19 dye from Aldrich) is added to the mixture. After strirring for about 15 hours at about 30° C., the mixture is diluted with about 40 ml DMSO and added to about 500 ml acetone. The precipitate that forms is isolated by vacuum filtration. The resulting filtered cake is washed several times with acetone and dryed in a vacuum oven at about 60° C. to yield a polyvinyl alcohol-dye.

EXAMPLE 4

Preparation of Functionalizer 220 grams of sodium hydroxide is dissolved in 300 grams water and 700 grams ice in a 3-liter reactor having a stirrer and cooling system. The sodium hydroxide solution is cooled to 10° C. 526 grams of aminoacetaldehyde dimethylacetal and 50 mg of 4-hydroxy-2,2,6,6-tetramethylpiperidin-1-oxide (a radical inhibitor) are added to the sodium hydroxide solution. 548.6 grams of methacrylic acid chloride are slowly added to the solution at 10° C. over a period of 3.5 hours. The pH value drops slowly to 7.2 when the addition is complete, and amine can no longer be detected by gas chromatography. The mixture is extracted with 500 ml of petroleum ether, and in order to remove impurities, the aqueous phase is saturated with sodium chloride and extracted three times with 500 ml of tert-butyl methyl ether. The organic phase is dried with magnesium sulfate, filtered and concentrated using a rotary evaporator. The resulting 882.2 g. of yellowish oil are slowly stirred into 2000 ml of petroleum ether at −10° C. by means of an Ultraurax. The product crystallizes, and is isolated by filtration and dried. 713.8 grams of methacrylamidoacetaldehyde dimethylacetal, having a melting point of 30–32° C. are obtained. The product is 99.7% pure according to gas chromatography.

EXAMPLE 5

Preparation of Crosslinkable Polymer Precursor 300 grams of Mowiol 4-88 (from Hoechst) are placed in a 2-liter double-jacket reactor havingn a strirrer and thermometer. 800 grams of deionized water are added to the reactor, and the aqueous mixture is heated to 95° C. with stirring. After about an hour, a clear solution of PVA is produced. The solution is cooled to 20° C.

27 g. of methacrylamidoacetaldehyde dimethyl acetal functionalizer (from Example 4), 440 g. of acetic acid, 100 g. of concentrated hydrochloric acid (37%) and 333 g. of deionized water are mixed to produce a 2000 g. reaction solution. The mixture is stirred for 20 hours at 20° C. to produce a crosslinkable poly(vinyl alcohol). The change in acetate content can be ascertained by titration with acetic acid.

EXAMPLE 6

Purification of Crosslinkable Polymer Precursor

The crosslinkable PVA solution from Example 5 is cooled to 15° C. and the pH is adjusted to 3.6 with aqueous 5% sodium hydroxide. The polymer solution is filtered by means of ultrafiltration. The ultrafiltration is accomplished by using a 1-KD-Omega membrane produced by Filtron. Ultrafiltration is continued until a residue sodium chloride content of 0.004% is achieved. However, before purification is completed, the solution pH is adjusted to 7 with 0.1 N sodium hydroxide solution. Concentration of the filtered solution yields 1995 grams of a 14.54% crosslinable PVA solution with N-content of 0.683% (by Kjendahl determination), acetate content of 2.34 meg/g. (by hydrolysis), inherent viscosity of 0.310, double bonds of 0.5 meq/g. (by microhydrogenation), free hydroxyl groups of 15.3 meq/g. (by reacetylation), and molecular weights of Mw=19,101 and Mn=7522 (by gas phase chromatography in water).

EXAMPLE 7

Formation of Contact Lens

About 0.01 g. of purified polymeric dye from Example 2 is added to about 20 g. of the purified crosslinkable PVA solution of Example 6. About 0.45 weight percent of IRGA-CURE 2959 (based on total crosslinkable PVA content) is added to the solution. An appropriate amount of the solution is dispensed into a double-sided transparent polypropylene contact lens mold. The mold is irradiated for about 10 seconds with a 200 Watt Oriel UV lamp (150 mW/cm$^2$). A transparent blue tinted lens is produced.

The invention has been described in detail, with reference to certain preferred embodiments, in order to enable the reader to practice the invention without undue experimentation. However, a person having ordinary skill in the art will readily recognize that many of the components and parameters may be varied or modified to a certain extent without departing from the scope and spirit of the invention. Furthermore, titles, headings, or the like are provided to enhance the reader's comprehension of this document, and should not be read as limiting the scope of the present invention. Accordingly, the intellectual property rights to this invention are defined only by the following claims and reasonable extensions and equivalents thereof.

That which is claimed is:

1. A method of forming a radiation-absorbing polymeric article, comprising the steps of:
   (a) providing a polymerizable or crosslinkable material;
   (b) providing a polymeric dye, which is at least substantially free of reactive sites that chemically react with said polymerizable or crosslinkable material;
   (c) introducing said polymeric dye and said polymerizable or crosslinkable material into a mold; and
   (d) initiating crosslinking or polymerization to form a solid polymer article having a polymeric matirx, thereby physically entrapping said polymeric dye within said polymeric matrix.

2. A method of claim 1, wherein said step of providing a polymeric dye comprises:
   (i) providing a reactive polymeric dye precursor;
   (ii) providing an activated reactive dye; and
   (iii) mixing said reactive polymeric dye precursor with said activated reactive dye, thereby causing a reaction and forming a polymeric dye.

3. A method of claim 2, wherein said step of providing a polymeric dye comprises:
   (i) providing a reactive polymeric dye precursor by adding a crosslinking agent to a polymeric dye precursor to form a polymeric dye precursor having reactive groups;
   (ii) providing an activated reactive dye by increasing the pH of the reactive dye solution to a basic level; and
   (iii) mixing said reactive polymeric dye precursor with said activated reactive dye, thereby causing a reaction and forming a polymeric dye.

4. A method of claim 1, wherein the dye is selected from the group consisting of ultraviolet light-absorbing agents and visible light-absorbing agents.

5. A method of claim 1, wherein the dye is selected from the group consisting of halotriazines and vinyl sulfones.

6. A method of claim 5, wherein the dye is a vinyl sulfone dye.

7. A method of claim 1, wherein the polymeric article is an ophthalmic lens.

8. A method of claim 7, wherein the ophthalmic lens is a contact lens.

9. A method of claim 1, wherein the polymeric article is a hydrophilic polymer.

10. A method of claim 2, wherein the polymeric dye precursor is a poly(vinyl alcohol).

11. A method of claim 1, wherein the polymerizable or crosslinkable material is a poly(vinyl alcohol).

12. A method of claim 1, wherein the polymerizable or crosslinkable material has a weight average molecular weight of at least about 2000.

13. A method of claim 12, wherein the polymerizable or crosslinkable material has a weight average molecular weight of about 10,000 to about 300,000.

14. A method of claim 1, wherein the polymeric dye has a weight average molecular weight of at least about 2000.

15. A method of claim 1, further comprising the step of purifying the polymeric dye.

16. A method of claim 15, wherein said purification includes at least one ultrafiltration step.

17. A method of claim 15, further comprising the step of purifying the polymerizable or crosslinkable material.

18. A method of claim 17, wherein said purification includes at least one ultrafiltration step.

19. A method of claim 1, further comprising the steps of purifying the polymerizable or crosslinkable material and the polymeric dye, wherein both purification steps include at least one ultrafiltration step.

20. A method of claim 1, wherein the weight percentage of polymeric dye, based on total dehydrated polymer article weight, is about 0.001 to about 2%.

21. A method of claim 1, wherein the polymerizing or crosslinking occurs in a period of about 5 seconds to about 30 minutes.

22. A method of claim 21, wherein the polymerizing or crosslinking occurs in a period of less than about 5 minutes.

23. A method of forming a polymer article of claim 1, wherein the article is formed in the complete absence of extraction processes subsequent to molding.

24. A method of forming a tinted contact lens, comprising the steps of:
   (a) providing a first aqueous solution of a polymeric precursor, wherein the polymeric precursor has a weight average molecular weight of at least about 2000;
   (b) adding an reactive dye to the first polymer precursor solution, wherein the dye is selected from the group consisting of visible light-absorbing agents and ultraviolet light-absorbing agents, thereby forming a polymeric dye and at least substantially eliminating the reactive sites of said polymer precursor;
   (c) prodding a second aqueous solution of a crosslinkable polymeric precursor, wherein the crosslinkable polymeric precursor has a weight average molecular weight of at least about 2000;
   (d) mixing the polymeric dye with the crosslinkable polymeric precursor solution;
   (e) introducing the mixture into a contact lens mold; and
   (f) crosslinking the crosslinkable polymer precursor to form a tinted contact lens comprising a polymer produced from said polymer precursor such that said dye is physically entrapped in said polymer.

25. A method of claim 24, further including the step of activating the reactive dye by raising the pH of the solution to a basic pH.

26. A method of forming a contact lens of claim 24, wherein the lens is formed in the complete absence of extraction processes.

27. A method of claim 24, wherein the crosslinkable polymer precursor is a poly(vinyl alcohol).

28. A polymeric article which is a crosslinked or polymerized product of
   (a) a polymeric dye; and
   (b) a polymerizable or crosslinkable polymeric precursor, wherein the polymerized or crosslinked polymer produced from said polymeric precursor physically entraps said polymeric dye without chemical bonding.

29. An article of claim 28, wherein the article is an ophthalmic lens.

30. An article of claim 29, wherein the ophthalmic lens is a contact lens.

31. An article of claim 28, wherein the polymeric dye has a weight average molecular weight of at least about 2000.

32. An article of claim 28, wherein the polymerizable or crosslinkable polymeric precursor has a weight average molecular weight of at least about 2000.

33. An article of claim 32, wherein the polymerizable or crosslinkable polymeric precursor has a weight average molecular weight of about 10,000 to about 300,000.

34. An article of claim 33, wherein the polymerizable or crosslinkable polymeric precursor has a weight average molecular weight of about 10,000 to about 50,000.

35. An article of claim 28, wherein the polymeric precursor is a poly(vinyl alcohol).

36. An article of claim 28 which is formed in the complete absence of extraction processes.

37. An article of claim 28, wherein the amount of dye or polymeric dye which is leachable from the article is an insubstantial amount such that said dye or polymeric dye causes no occular irritation or damage.

38. A method of incorporating a radiation-absorbing agent into a contact lens or intraocular lens, comprising:
   (a) mixing a polymeric dye with a crosslinkable or polymerizable material; and
   (b) initiating polymerization or crosslinking to form a polymer of said crosslinking or polymerizable material such that said dye is physically entrapped in said polymer;
   wherein said polymeric article does not require a subsequent extraction and wherein said polymeric dye has no reactive sight that can crosslink or polymerize with said crosslinkable or polymerizable material.

39. A method of claim 38, wherein the polymeric article is an ophthalmic lens which is suitable for use in the human ocular environment in the absence of an extraction step following polymerization or crosslinking.

40. A method of claim 38, wherein the polymerizable or crosslinkable material is a poly(vinyl alcohol).

41. A method of forming a polymeric dye, comprising:
   (a) providing a polymeric dye precursor having a weight average molecular weight greater than about 2000 and including reactive groups;
   (b) providing activated reactive dye having reactive groups and being capable of absorbing radiation;
   (c) contacting the reactive dye with the polymeric dye precursor, thereby forming a polymeric dye having a weight average molecular weight greater than about 2000, wherein said polymeric dye has no reactive groups, which would be physically entrapped by a polymer if it were added to it's precursor prior to it's polymerization.

42. A method of claim 41, wherein said reactive dye is a vinyl sulfone dye.

43. A method of claim 42, wherein said polymeric dye precursor is a poly(vinyl alcohol).

* * * * *